Oct. 22, 1935.  V. E. CLARK  2,018,546
AILERON CONTROL
Filed May 3, 1933
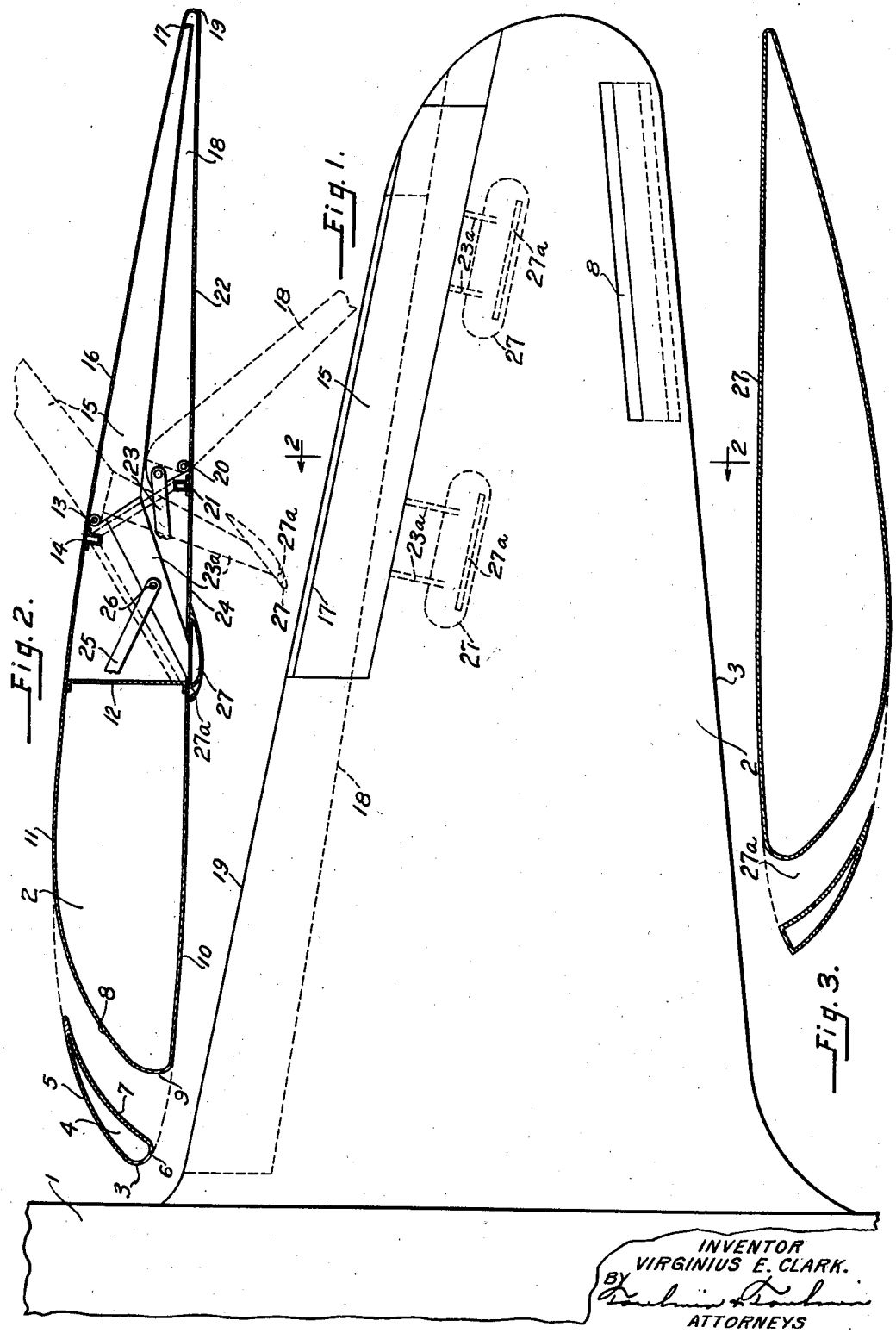
INVENTOR
VIRGINIUS E. CLARK.
BY
ATTORNEYS Patented Oct. 22, 1935

2,018,546

UNITED STATES PATENT OFFICE 2,018,546

AILERON CONTROL

Virginius E. Clark, Baltimore, Md., assignor, by mesne assignments, to North American Aviation, Inc., a corporation of Delaware Application May 3, 1933, Serial No. 669,219

8 Claims. (Cl. 244—29)

It is the object of my invention to provide an apparatus and method for maintaining or disturbing equilibrium of an airplane and to regulate the lift of the airfoil, thereby controlling to a degree the flying speed.

The primary purpose of the flap is to permit any airplane, with given weight and wing area, to land in a small field or a field surrounded by obstacles. Toward this end, it functions in two helpful ways. First, with downwardly displaced flap, the airplane can, while gliding over obstacles and into the field, not only glide at slower air speed because of the increased lift of its wing or wings, but, probably more important and valuable, can, because of the great increase in aero-dynamic drag from the flap, glide along in a much steeper flight path without picking up excessive air speed. Thus, compared with an airplane without flap, during its glide before landing, it can, after passing over a given obstacle, advance, say, more than one quarter of the distance across the landing field while losing altitude, and also, at the instant of contact with the ground in a normal landing, will have not over 60 percent of the knietic energy, because of its slow speed resulting from high lift, to be dissipated during the landing run.

The upturning aileron with neutral position in extension of normal wing airfoil, whether operating with or without another surface directly underneath it, has the following advantages over an aileron system in which one aileron turns downward while the other turns up.

A downturning aileron is very ineffective in producing proper rolling moments on the airplane when the angle of attack of the airplane as a whole is beyond that of the burble or stall. Furthermore, the yawing moment resulting from the increased aerodynamic drag of a downturning aileron is such as to turn the airplane in the wrong direction. The drag of the downturned aileron tends to make the airplane turn around that wing tip, increasing the airspeed, and, therefore, the lift on the opposite wing, producing a secondary rolling moment in the wrong direction. The upturning aileron is much more effective in rolling moments at angles of attack of the wing beyond the burble or stall, and the yawing moment, due to the drag of the upturned aileron, when turned up through a large angle of displacement, is such as to produce secondary rolling moment in the proper direction.

My present scheme for the aileron, having it operated upwardly only, permits sufficient aileron area for proper rolling moment and lateral control without excessive aileron hinge moments and control forces.

It is my further object to provide a wing section having the foregoing means and capable of practicing the foregoing method in combination with a construction to increase the effectiveness of the airfoil at high angles of attack by greatly delaying the burble.

It is my object to provide an aileron which is statically and aerodynamically balanced and which will be limited positively in its movements at the extreme of such movements.

It is my object to provide the combination of a pivoted flap, a pivoted balanced aileron and the further combination of the foregoing elements with a wing having a fixed nose slot to increase the effectiveness of the airfoil at high angles of attack by greatly delaying the burble.

It is my object to provide such a flap and such an aileron which, when in their respective at-rest positions, may rest one against the other or overlap one another to a greater or less extent, may partially interengage or telescope one within the other and present a continuous wing surface.

It is my object to provide a balanced aileron applicable to any airplane wing and particularly applicable to an airplane wing equipped with a split trailing edge flap which is preferably faired with or within the under surface of the wing when retracted. The upper surface of this aileron forms when in the extension position a continuation of the upper wing surface while its under surface may follow approximately the median line of the airfoil, while the upper surface of the flap and the aileron may overlap each other, or rest against one another.

The extension position of the aileron is its position when its cross section serves to complete the normal airfoil section of the wing portion. The neutral position of the aileron may be slightly above such extension position.

The aileron may either have a neutral position in its extension location, or may be a floating aileron.

It is well known that the hinge moments, and, hence, pilot's control forces, are much greater at high airplane speeds than at low airplane speeds for a given angle of displacement of the aileron. For an aileron having given area and spread, and shape, and for a given air density and given angle of displacement of the aileron, the hinge moments vary approximately as the square of the air speed. On the other hand, just so do the rolling moments vary. Hence, only comparatively small angles of displacement of aileron are necessary at high speed, but with ordinary ailerons the control forces to produce these angles of aileron displacement are high.

At low speeds, the hinge moments for given angles of displacement are low, but so are the rolling moments. Hence, it is necessary to use much greater angle of displacement for necessary rolling moments at low airplane speeds than at high. The pilot's control forces, however, for these large angles of displacement at slow airplane speeds are comparatively low.

If it is desired to change or adjust the region at which balancing moments will be high, and correspondingly increase or reduce the range where balancing moments will be low, this can be accomplished either by change in the airfoil section of the balance, its angle, (with relation to the aileron) its aspect ratio, or by introducing a linkage system between aileron and airfoil balance in order that the airfoil balance will not rotate through the same angle as does the aileron.

It is my object to provide a paddle balance or balances which, when properly located and proportioned, act as an aerodynamic member or members reducing both torsional and bending moments on the aileron structure.

It is a further object to have the advantage of a mass forward of the hinge axis, secured to, and rotating with, the aileron structure, in order to bring the entire aileron system in static balance about its axis of rotation, or to over balance it statically, thus reducing the hazards of and/or from the aileron and/or wing flutter.

It is a further object to provide by the upturning of the aileron an effective means in creating proper rolling and yawing moments in the region of, and at the angles of attack above the stall position. The downwardlly acting aerodynamic lift and the drag of the aileron balance of my invention not only reduce the aerodynamic hinge movements of the aileron (and resulting control stick forces) but also the aerodynamic drag of the balanced airfoil serves to create helpful yawing moments on the airplane, forcing the wing with the upturned aileron to travel more slowly through the air than the opposite wing. This difference in air speed between the two wings (with resulting difference in lift) tends to raise the wing opposite to the upturned aileron.

In particular it is my object to provide an aileron that is not only balanced but also a part of the airfoil curve.

Referring to the drawing:

Figure 1 is a top plan view diagrammatically illustrating a typical wing structure having the balanced aileron and wing flap; the control details for actuating the aileron and flap are omitted for the purpose of clarity;

Figure 2 is a section on the line 2—2 showing the arrangement of an upturning aileron with balance underneath the wing, a flap and a fixed wing nose slot to increase the effectiveness of the airfoil at high angles of attack by greatly delaying the burble;

Figure 3 is an enlarged diagrammatic section illustrating the slot in the paddle balance.

I have not illustrated in detail the control mechanism for the actuation of the aileron and flap as those particular detailed features form no part of the present invention and for the purpose of simplicity have been omitted except as shown to the limited extent in the drawing.

Referring to the drawing in detail, 1 is a fuselage having a wing 2. The wing is provided with a leading edge 3. This leading edge section at 4, having an upper surface 5 and a lower surface 6, may have an inner slotted surface at 7 spaced from the surface 8 of the main portion of the wing which is provided with a nose 9, an under surface 10 and an upper surface 11. 12 indicates a wing spar. Pivoted at 13 just behind the aileron spar 14 is an aileron 15, the upper surface of which at 16 is a continuation of the upper surface 11 of the wing airfoil, its rear edge at 17 may telescope as shown within the notched trailing edge of the wing formed by the wing flap 18. The trailing edge is designated 19. This wing flap is in turn pivoted at 20 just aft of the spar 21. Its lower surface 22 is a continuation of the under surface or lower surface of the wing airfoil. The flap is actuated about its pivot 20 by an actuating pitman or other form of linkage 23.

Returning to the aileron 15, it will be noted that its pivot is forward of and above the pivot 20 of the flap. Below the pivot 13 extending downwardly and diagonally forwardly is an arm or a pair of arms 23a which are adapted to move with the airfoil through a slot 24 in the lower surface 10 of the wing. The aileron actuating pitman or other actuating linkage 25 is pivotally connected at 26 to one or more of these arms 23a. On the bottom of these arms is carried an aileron balance mass of weight 27 having the shape of an airfoil section.

It will be noted that the longitudinal extension of the flap and of the aileron will not be coextensive. It will be further noted that the transverse extension will not be coextensive or there will be greater or less degree of overlapping of the two structures. Thus, the aileron may nest in the wing structure wholly or partly.

The paddle balance itself as indicated has an under surface that is a simple mathematical curve. The change in radius of the curvature is continuous. The paddle balance has a fixed nose slot 27a, the function of which is hereinafter described.

With reference to the maximum thickness of the balance airfoil, it ranges from .12 to .16 of the chord length. The maximum ordinate of its upper surface will be about .4 chord from the leading edge. This is a preferred type of airfoil section for aileron balance, but, of course, this will vary according to the design of the plane. The wing flap 18 controls the lift of the wing airfoil, thereby permitting considerably lower flying speeds, increases the lift of the airfoil without making it necessary to fly with the fuselage of the plane inclined at a horizontal, and thereby permits departure and landing with the fuselage in a more horizontal position, and it also permits of the equalizing of the drift of opposite wings while maintaining lateral balance, but the full effectiveness of the flap is not gained until my balanced aileron which is a part of the airfoil curve is employed. By the use of my aileron it is possible to reduce hinge movements at small angles of displacement and to reduce hinge movements at large angles of displacement.

When the airfoil balance for the aileron is suitably designed, the rate of change of resultant or total aerodynamic force on it, with its change in its angle of attack, corresponding to the angle of displacement of the aileron, will be high at low angles and low at high angles.

In practice, while the aileron motion is upward, it need not be confined to upturning from the extension position alone as it is possible to allow the aileron to float in a neutral position above that of the extension position and then pull it downwardly to extension position whenever desired. It is also possible, immediately after landing, to simultaneously move both ailerons upwardly as aerodynamic brakes in conjunction with the lowered flaps. The combination is effective because the lowered flaps substantially increase the air speed over the upper surface of the wing and therefore increase the forces on the aileron surface, assisting in quickly reducing the speed of the airplane.

While the drawing shows the aileron having a higher chord than the flap, the opposite condition can be true by having the aileron balance arm slide within the flap instead of the wing. This question of design depends upon the most suitable ratios of aileron and flap chord to wing chord. In practice, I recommend as a typical form, the use of a split trailing edge flap having a chord of 12% to 19% of that of the wing chord.

Furthermore, it will be observed that the mass for balancing the aileron is on the underside of the wing: protuberances on the under surface of an airfoil are far less detrimental to lift and drag than similar obstructions above the wing, unless near the leading edge.

Furthermore, the well in the wing required for the movement of the balance arm can be sealed by any suitable means sliding with the arm on the under surface of the wing.

It will be noted that the mass or paddle balance acts also as a positive stop against the wing with the aileron in extension position. Both the aileron and flap operating mechanisms can be totally concealed within the wing to reduce drag and the aerodynamic and static balance mass can be recessed within the lower wing surface to further eliminate drag.

I believe that the "split" type of aileron may have certain distinct advantages over an aileron which consists merely of a flap of thickness the same as that of the wing airfoil. When an aileron is forced upward away from the presence of another surface underneath it, such as a portion of the wing, or a portion of the wing flap, whether the flap is in the up or down position, I believe that its rolling moment will be greater, and also its drag and yawing moment. This is because a V shaped void, with the apex of the V forward, is formed. In this void the air pressure is comparatively low. This suction tends to greatly increase the aerodynamic drag of the upturned aileron, producing yawing moment in the proper direction. Furthermore, the V void suction increases the velocity of air flow over the upper surface of the upturned aileron, increasing the pressure on the forward side of it, and augmenting the downward force increasing the rolling moment. Further, with the flap down and the aileron up, the increase in aerodynamic force on the flap is of such a nature as to increase the "circulation" velocity around the airfoil as a whole. This increase in velocity over the top of the wing further tends to increase the force on the aileron and resulting rolling and yawing moments. Furthermore, a secondary increase in rolling moment may be expected with the aileron up and flap down because the increase in force on the upturned aileron tends to reduce the circulation velocity on the wing as a whole; hence, reducing the lift on the downturned flap, causing rolling moment in the proper sense.

The paddle balance location and arrangement I have suggested are new and offer certain distinct advantages. First, the aerodynamic drag as affecting the speed and general performance of the airplane may be expected to be lower and superior to other forms of aerodynamic balance. When the aileron is in neutral or extension position, the paddle balance lies with its flat face smoothly against the lower surface of the wing. Thus, its convex, streamlined form only is exposed to the flow of the air, the streamline pointing in the proper direction for minimum aerodynamic drag.

Furthermore, the aerodynamic drag of any body protruding below the under surface of a wing, and well to the rear of the leading edge of a wing, is known to be less than at any other location in the vicinity of the wing. This is because the relative air velocity is less in this region. When the aileron is in extension position, no horns or other supporting structure of the paddle balance are exposed to the airflow.

A further advantage of this type of balance is that it offers the minimum aerodynamic drag with aileron neutral, but a greatly increased drag (and resulting yawing moment) when the aileron is displaced upward. When the aileron is displaced upward in order to push that wing tip downward, it is obvious that the aerodynamic drag of the paddle balance with its supporting horns will be greater than the drag of the "flush" paddle balance near the opposite wing tip. This change in aerodynamic drag introduces yawing moments in the proper direction for lateral control and maneuverability.

Another advantage of this system is that the paddle balance becomes an aileron itself augmenting the rolling moment effective of the primary aileron. The paddle balance is an airfoil with flat face upward and cambered surface downward. Thus, as it is rotated with the aileron, it produces downward acting lift and resulting rolling moment in the same sense as does the primary aileron.

Another advantage in this location for paddle balance is that the disturbance on the general air flow created by the presence of the paddle does not have any harmful effect upon the aileron. If a paddle balance were mounted to an upturning aileron, the paddle being above the wing and forward of the aileron, the turbulent airflow left in the wake of the paddle would reduce the aerodynamic forces and rolling moments on the aileron in the rear of it.

With the new suggested location, this is not true.

A further advantage of this type of aerodynamic balance is that the same airflow or mass can readily be used to bring the aileron system into mass or static balance eliminating hazards of and from aileron and wing flutter. With this type of balance, this can be accomplished with a minimum of added weight, because of the comparatively long moment arm of the paddle forward of the hinge axis.

One type of airfoil which may be used for a paddle balance is a type of such cross section and general shape that burble and sharp reduction of lift do not occur until very high angles of attack of the balancing airfoil. This may be accomplished by introducing one or more slots near the leading edge by making the leading edge very low (almost an extension of the flat surface) and having the leading edge quite sharp, and/or by using a simple mathematical curve for the cambered surface, or a combination of two or more of these features.

An advantage in delaying sharp loss in lift is to insure sufficient balancing forces and moments when the aileron is displaced through a very sharp angle away from neutral, thus reducing control forces at very large angles of aileron.

The slot in the leading edge of the wing is introduced in combination with the upturning aileron for the following purposes:

1. At high angles of attack, when the air tends to burble and leave the upper surface of the wing, the vane forward of the slot can wash the air downwardly so that it will cling to the upper surface of the wing. This delays the burbling and turbulent air flow and tends to force the stream of air in smooth flow and at high velocity (not slowed down by the creation of eddies) against the forward or upper surface of the upturned aileron, thereby increasing the force on the aileron and resulting rolling moments.

2. Another effect, also due to the delay of the burbling and resulting loss in lift of the wing at angles of attack higher than that at which the burble would otherwise occur, is to increase the lateral dynamic stability of the wing as a whole at high angles of attack by increasing the wing lift at very high angles of attack. The "damping" moment is maintained, which tends to resist rotation of the airplane about its longitudinal horizontal axis.

The system may comprise any one, or any combination of two or more of the following basic elements:

1. Split trailing edge, downwardly displaced wing flap.

2. An aileron upwardly displaced, which may be superposed over part of the wing flap or part of the wing proper, or parts of both.

3. One or more paddle balances for the upwardly displaced aileron which lies underneath the wing proper.

4. A slot in the leading edge of the wing proper.

It will be understood that, when I refer to the aileron as a means of lateral equilibrium, I do not desire to confine myself to this, as it is highly desirable on military airplanes that the aileron be effective in disturbing or upsetting lateral equilibrium because the object is to secure both maneuverability in combat as well as controlability.

Another important feature connected with the action of the leading edge as well as with relation to the upturning ailerons is that both actions are intended to work simultaneously on opposite wing tips. Taking the condition when the main wing is operating at an angle of attack higher than its stall or burble and further considering that the wing is rolling upwardly, or as high, then, obviously, the control will be to turn the aileron on that side upwardly. In this condition, the action of the leading edge slot is to sweep the air current downwardly making it cling to the upper surface of the wing and attack the upturned aileron in smooth and high velocity flow, thus increasing the downward force and rolling moment on this upturned aileron. Near the opposite wing tip, at the same time, with the wing tip rotating downwardly, or standing low, with its angle of attack, because of its downward rotation, or for any other reason, higher than the burble point if the wing did not have the leading edge point slot, the action of the slot is as described in that it increases the lift of this downturning or downstanding wing tip at angles of attack beyond those which would burble the wing if the slot were not present.

The net result, then, with these two types of action of the leading edge wing slot working at the same time—one action on one wing tip in the aileron region, and the other type of action on the opposite wing in the aileron region,— is to bring back both sides of the wing at very high angles of attack of the wing to conditions similar to those which would exist on both wing tips at angles below the normal stall angles. This is an important feature because, without the two different effects of the slot as described, it would be extremely difficult to produce satisfactory rolling moment on an upturning aileron of the type I have disclosed at very high angles of attack of the wing as a whole.

The critical condition is to obtain sufficient and satisfactory rolling moments and rolling, resisting or dampening moments, at angles of attack of the wing beyond those angles which would be burble angles if the leading edge wing slots were not present. In other words, the leading edge wing slot helps the aileron on the upper or upwardly turning wing and helps the wing itself on the down or downwardly turning side.

The leading edge wing slot on each side should have a length along the leading edge approximately one-half the span of one aileron. The slot should be forward of the aileron.

It will be understood that I desire to comprehend within my invention such modifications as come within the scope of my claims and my invention.

Having thus fully described my invention, what I claim as new and desire to secure by Letters Patent, is:

1. The combination, in an airplane, of a wing, an upturning aileron pivoted thereto, and a balancing means acting as a stop for the aileron mounted on said aileron below the wing.

2. The combination, in an airplane, of a wing, an upturning aileron pivoted thereto, and a balancing means acting as a stop for the aileron mounted on said aileron oppositely disposed from the aileron with respect to the pivot of the aileron on the wing and forwardly disposed of said aileron with respect to its pivoting and below the point of pivot of said aileron.

3. The combination, in an airplane, of a wing, an upturning aileron pivoted thereon, the upper surface of which is an extension of the upper surface of the wing, means on said aileron travelling with it about its pivot limiting its movement in one direction and constituting an aileron balance, said aileron balance extending forwardly and downwardly to a point adjacent the under surface of the wing adapted to move from that point to a point below the wing.

4. In an airplane, a wing having pivoted thereon an upturning aileron, the upper surface of which 's an extension of the trailing edge of the wing, an arm on said aileron extending downwardly and forwardly of the aileron with respect to the pivot thereof, an aileron mass on the end of said arm located in engagement with the bottom of the wing and adapted to act as a limiting member for the movement of the aileron in one direction, said wing having means to cause the movement of the mass downwardly.

5. In an airplane, a wing having pivoted thereon an upturning aileron, the upper surface of which is an extension of the trailing edge of the wing, an arm on said aileron extending downwardly and forwardly of the aileron with respect to the pivot thereof, an aileron mass on the end of said arm located in engagement with the bottom of the wing and adapted to act as a limiting member for the movement of the aileron in one direction, said wing having means to cause the movement of the mass arm downwardly, and a nose slot in the nose of the balance airfoil adapted to greatly delay burble on the mass under the surface of the wing.

6. In an airplane, a wing having pivoted thereon an upturning aileron, the upper surface of which is an extension of the trailing edge of the wing, an arm on said aileron extending downwardly and forwardly of the aileron with respect to the pivot thereof, an aileron mass on the end of said arm located in engagement with the bottom of the wing and adapted to act as a limiting member for the movement of the aileron in one direction, said wing having means to cause the movement of the mass downwardly, and a flap constituting the under side of the trailing edge of the wing pivoted thereto adjacent to at least a portion of said aileron.

7. In an airplane, a wing having pivoted thereon an upturning aileron, the upper surface of which is an extension of the normal upper profile of the wing, an arm on said aileron extending downwardly and forwardly of the aileron with respect to the pivot thereof, an aileron mass on the end of said arm lying against the bottom surface of the wing and adapted to act as a limiting member for the movement of the aileron in one direction, said wing having means to cause the movement of the mass downwardly, and a fixed nose slot in the nose of the balance airfoil adapted to greatly delay burble of the balancing airfoil, and a flap constituting the under side of the trailing edge of the wing pivoted thereto adjacent to at least a portion of said aileron.

8. In combination, a wing having a fixed nose slot to greatly delay burble on its upper surface, an aileron, and a paddle balance connected to and serving as a stop for the aileron, said balance being located beneath said wing.

VIRGINIUS E. CLARK.